(12) United States Patent
Spooner

(10) Patent No.: US 7,455,019 B2
(45) Date of Patent: Nov. 25, 2008

(54) DRUM PUNCH SEED PLANTER

(76) Inventor: Steve Spooner, 435 Quail Rise, Sylvester, GA (US) 31791

( * ) Notice: Subject to any disclaimer, the term of this patent is extended or adjusted under 35 U.S.C. 154(b) by 364 days.

(21) Appl. No.: 11/360,751

(22) Filed: Feb. 23, 2006

(65) Prior Publication Data

US 2007/0193482 A1 Aug. 23, 2007

(51) Int. Cl.
*A01C 7/00* (2006.01)
*A01C 9/00* (2006.01)

(52) U.S. Cl. ............................................. 111/182

(58) Field of Classification Search ................ 111/182, 111/178, 177
See application file for complete search history.

(56) References Cited

U.S. PATENT DOCUMENTS

| | | | |
|---|---|---|---|
| 1,604,624 A | 10/1926 | White | |
| 2,168,855 A | 8/1939 | Aspenes | |
| 2,778,291 A | 1/1957 | Kerns | 97/52 |
| 3,796,346 A | 3/1974 | Ribouleau | 221/211 |
| 3,811,389 A | 5/1974 | Rother | 111/91 |
| 3,815,524 A * | 6/1974 | Poll | 111/100 |
| 4,023,511 A | 5/1977 | Newman | 111/89 |
| 4,117,787 A | 10/1978 | Pavan | 111/2 |
| 4,384,812 A * | 5/1983 | Miyagawa | 411/410 |
| 4,898,108 A | 2/1990 | McDermott | 111/185 |
| 4,941,416 A | 7/1990 | Faulring | 111/102 |
| 5,082,126 A | 1/1992 | Ribouleau | 221/211 |
| 5,359,948 A | 11/1994 | Makkink | 111/177 |
| 5,535,917 A | 7/1996 | Ribouleau | 221/211 |
| 6,520,100 B1 | 2/2003 | Spooner, Sr. et al. | 111/59 |
| 6,895,876 B2 | 5/2005 | Bergere et al. | 111/134 |

OTHER PUBLICATIONS

"American Vegetable Grower," Jul. 2004, front page, pp. 46-48, 50-51, 64.
Monosem Twin-Row Planter, brochure, 2 pages, date unknown.
Stanhay Singulaire 785, brochure, 4 pages, date unknown.
The Polyplanter, advertisement, Nov. 7, 2005, 1 page.
ATI Inc. Monosem, 16 pages, date unknown.

* cited by examiner

*Primary Examiner*—Christopher J. Novosad
(74) *Attorney, Agent, or Firm*—Thomas, Kayden, Horstemeyer and Risley, LLP

(57) ABSTRACT

The seed planter includes a rotary drum (28) having a series of equally spaced seed cups (51) mounted on the inner surface of the cylindrical peripheral wall (32), and a seed meter (69) mounted over the arcuate path of the seed cups, in close spaced relationship over the large upper openings (54) of the seed cups to receive the seeds.

18 Claims, 8 Drawing Sheets

DRUM PUNCH SEED PLANTER

FIELD OF THE INVENTION

This invention concerns agricultural planters for planting seeds in previously formed crop rows that are covered with plastic sheeting known as "plastic mulch."

BACKGROUND OF THE INVENTION

The planting of crops is usually performed by forming rows of raised soil and planting either seedlings or seeds at spaced intervals along the rows. Water, fertilizer, and/or other additives may be applied to the area of the seedlings and seeds and nature takes its course. This invention concerns seed planting.

In recent years, planting seeds through plastic mulch has become more popular. Plastic mulch planting is an agronomic practice in which a thin sheet of plastic known as plastic mulch is placed on the crop row before planting to cover the crop rows. A drip tape, a fumigant and other fluids may be placed under and trapped by the plastic mulch to treat the soil and plants. The trapping of the fluids under the plastic mulch reduces their loss due to evaporation. The plastic mulch also tends to retard the growth of weeds in the area of the plastic.

When planting starts, holes are formed at intervals in the plastic and the seeds are passed through the holes into the soil. The plastic mulch usually allows the plants to start earlier in the year in cooler temperatures since the beds usually are heated by sunlight and the plastic traps the heat at the surface of the soil. These and other factors tend to increase yields of plastic mulch planting from about 100% to 200% over conventional non-plastic mulch planting. In order to economize, the plastic mulch usually is used for more than one season's planting, so the planting of the crops needs to be as non-destructive of the plastic mulch as possible.

Generally, it is more labor intensive and, therefore, more expensive to plant through plastic mulch than when planting without the plastic mulch. The costs at the present time for plastic mulch planting can be from about $600 to $1,000 more per acre as compared to planting in bare ground.

There are some prior art mechanical planters that have been developed for forming spaced holes in the crop rows and dropping seeds in the holes. For example, mechanical planting of seeds is shown in U.S. Pat. Nos. 2,168,855, 2,778,291, 3,811,389, 4,023,511, 5,359,948, and 6,520,100. Other prior art planters that teach the planting of seeds through plastic mulch include the Renaldo-European Planter GVB520 available from Renaldo's Sales & Service in North Collins, N.Y., and U.S. Pat. No. 4,941,416. These devices form holes in the plastic mulch by burning with propane gas holes in the plastic and plunging an arm through the holes and blowing the seed with air into the holes in the soil. Water is applied to the holes. Accurate timing is required to avoid excessive burning of the plastic and to place the seeds through the burned holes. The device requires long timing chains and a supply of propane gas.

One of the problems with the prior art seed planters is the timing of the dispensing of the seeds from a container and moving the seeds through the holes in the plastic mulch and into the holes in the soil. Seed metering units have been developed and are available, such as the Singulaire 785 vacuum seeder available from Stanhay Webb Limited, Suffolk, England, that reliably dispense seeds, usually one or two at a time. The seeds are moved through a pipe to a planter such as a rotary drum that has radially protruding punch feet that have the ability to penetrate the plastic mulch and dig a hole in the soil. However, it is difficult to control the timing of the rotation of the rotary drum and its punch feet with respect to the seed dispenser. In some cases the seeds are not passed to the punch feet in a timed relationship that delivers the seed to the soil beneath the plastic mulch.

Typically the seed dispenser is located higher and outside of the perimeter of the rotary drum which is far from the punch feet of the feeder. The distance of travel of the seed from the seed dispenser to the punch feet is so long that any disruption of the ideal timing of delivery of the seed to the punch feet is likely to cause the seeds to be out of time with respect to the punch feet. Such disruptions in timing can be caused by vibrations and surges of the planter during its normal operation and the bouncing of the seeds within the seed tube that delivers the seeds to the punch feet.

The connection between the rotary drum and the seed dispenser usually is formed by a timing chain that extends from the axle sprocket of the rotary drum to a driven sprocket on the seed dispenser. This requires a long chain drive. Due to vibrations, surges of velocity, and other non-uniform forces encountered by the machine, the longer the chain drive the more likely it is to be difficult to maintain the seed dispenser in timed relationship with the punch feet of the rotary drum.

It is to the above-described problems that this invention is directed.

SUMMARY

Briefly described, a seed planter is provided for planting seeds in a crop row that may be covered by a sheet of plastic mulch. The seed planter includes a support frame for mounting to a power vehicle such as to a towing tractor, and a rotary drum mounted to the frame for rolling movement over the surface of the ground. The rotary drum includes a cylindrical peripheral wall with the drum rotatably mounted at its central axis of rotation to the frame for rolling on its cylindrical peripheral wall along the crop row formed on the surface of the ground.

A series of soil punch tools or "feet" are mounted at circumferentially spaced intervals to and extend radially outwardly from the outer surface of the cylindrical peripheral wall of the drum. A series of seed receptacles are supported on the inner surface of the cylindrical peripheral wall of the rotary drum and are revolvable with the peripheral wall of the drum in a circular path about the central axis of the drum. Each seed receptacle is positioned at and rotates with a soil punch tool for feeding seeds through the peripheral wall to the soil punch tools.

A seed dispenser or "meter" for feeding the seeds to the seed receptacles is supported by the frame within the perimeter shape of the rotary drum and inwardly of the circular path of the seed receptacles. Preferably, a short timing chain arrangement is used for operating the seed meter in response to the rotation of the rotary drum.

Preferably, the rotary drum has one side wall, with the opposite side open, and a cylindrical peripheral wall mounted to the side wall. The seed dispenser is positioned within the cylindrical shape of the cylindrical peripheral wall of the rotary drum.

The driving relationship established between the rotary drum and the seed dispenser may include gears and timing chain movable in timed relationship with the rotation of the drum that drives the seed dispenser.

The punch tools that form the holes in the plastic mulch and in the ground beneath may be formed in a J-shape, each including a leg that extends radially from the cylindrical peripheral wall of the rotary drum and a toe that extends laterally from the leg. The legs of the punch tools are displaced from alignment with the seed passages of the cylindrical peripheral wall and the toes are approximately radially aligned with the seed passages. When the punch tools engage the plastic mulch and soil, the toes of the tools are aimed in the direction of movement of the rotary drum across the field. When the punch tools begin to withdraw from the soil the toes of the punch tools tilt as they withdraw from beneath the seeds. This permits the seeds that have been dropped onto the toes of the tools to fall away from the punch tools and remain in the hole beneath the plastic mulch.

The punch feet of the planter may be formed in cross section in a geometric shape that enhances penetration through the plastic mulch, such as triangular, rectangular, and other multiple sides such as hexagonal and octagonal shapes that have corners that tend to more readily penetrate the plastic mulch than a circular cross section.

DETAILED DESCRIPTION

Figure 1:
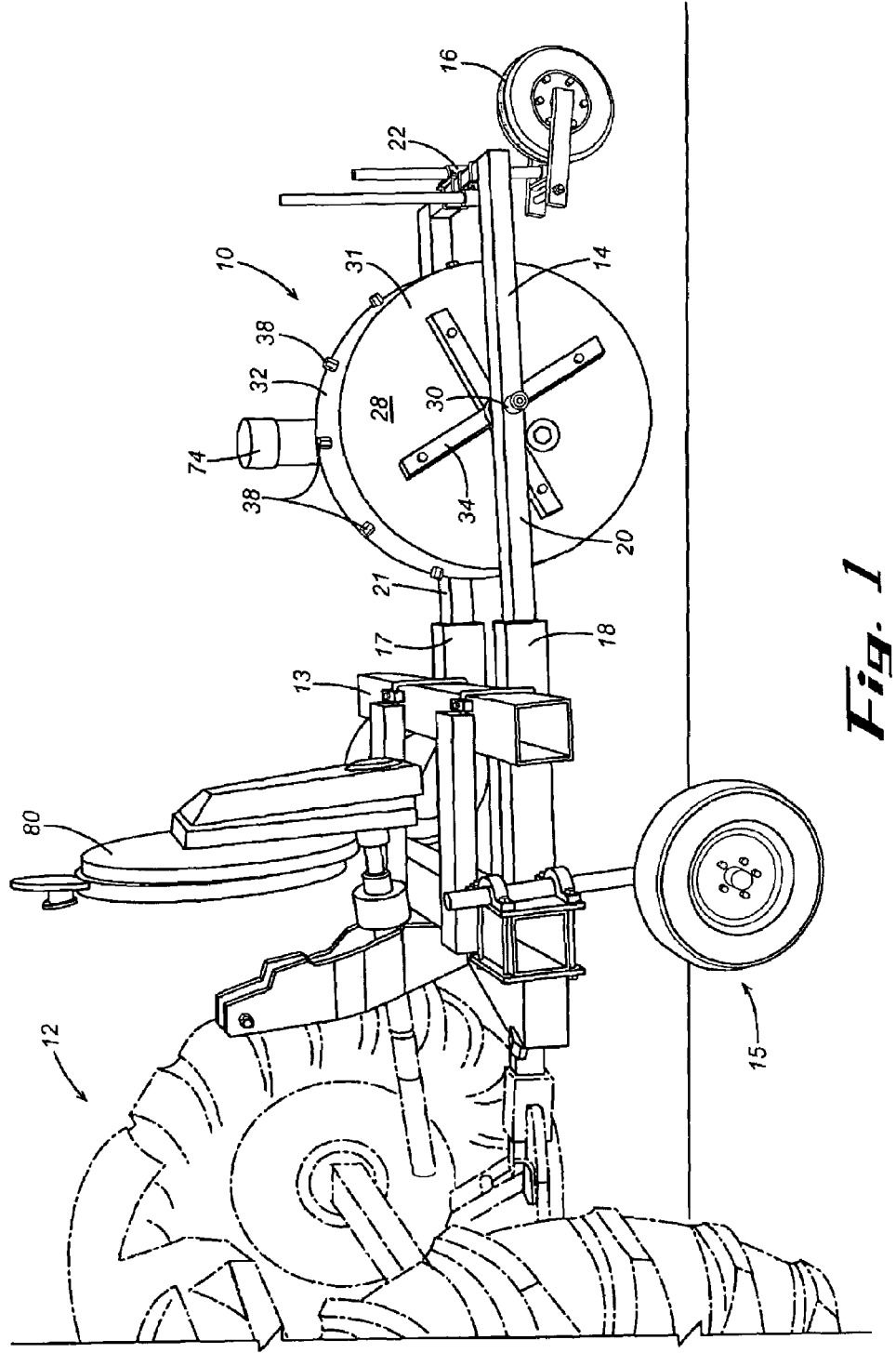
FIG. 1 is a side perspective view of the seed planter, showing it connected to the rear of a tractor.

Referring now in more detail to the drawings, in which like numerals indicate like parts throughout the several views, FIG. 1 illustrates a seed planter 10 that is moved by a vehicle, such as a tractor 12. The seed planter, which is in the form of a drum punch seed planter, includes a forward support frame 13 mounted on a pair of front wheels 15 and is attached to the tractor. A rear support frame 14 is pivotally attached by brackets 17 and 18 to the forward support frame. At least one rear wheel 16 yieldably supports the rear of the rear support frame and the rear wheel is shaped so as to close the holes formed in the soil by the seed planter. The rear wheel may include a pair of raised annular ribs that form an intermediate groove that tends to close the holes formed in the soil.

Figure 2:
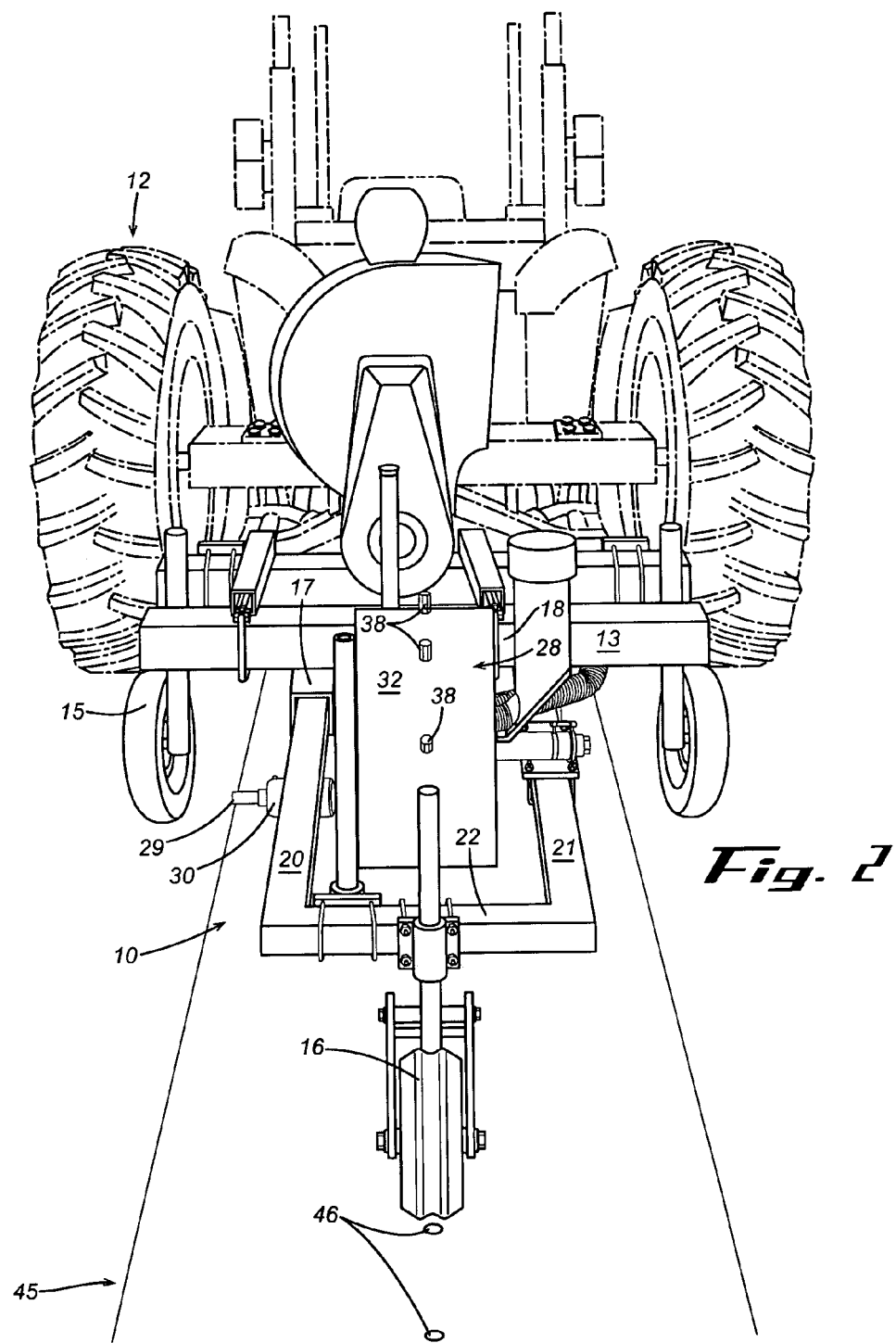
FIG. 2 is a rear perspective view of the seed planter, showing it as it is being pulled by a tractor.

As shown in FIG. 2, the rear frame 14 includes parallel longitudinal frame elements 20 and 21, and a transverse rear support frame element 22. The rear wheel 16 is spring-mounted to the rear support frame element 22. The forward ends of the pair of longitudinal frame elements 20 and 21 are pivotally mounted in the brackets 17 and 18 to the forward frame 13 that is supported by the front wheels 15. Therefore, the rear frame 14 is free to pivot about the brackets 17 and 18.

The rear frame is adapted for being moved longitudinally along the ground by the pull of the tractor 12, and is free to pivot up and down about the brackets 17 and 18 in response to the undulation of the surface of the ground.

Rotary drum 28 is mounted to rear frame 14, with its axle 29 extending from one of the pair of parallel longitudinal frame elements 20. One end of the axle is supported by bearings 30 and the other end of the axle extends into the rotary drum.

Rotary drum 28 includes a side wall 31 and a cylindrical peripheral wall 32. The other side of the drum remain open to accommodate the metering unit and its related components. Side wall 31 is reinforced by its attachment to the X-shaped support beams 34 to provide sufficient strength and attachment for the rotary drum. The axle passes through the bearings 30 with the X-shaped support beams being welded to the axle. Thus, the rotary drum 28 is rotatably mounted at its central axis to the frame for rolling on its outer cylindrical surface 32 about the central axis along the surface of the plastic mulch covered ground. The spring loaded rear wheel 16 yields under the weight of the rotary drum so that the rotary drum firmly engages the plastic mulch covered surface of the soil.

A series of soil punch tools 38 are mounted to the outer surface 57 of the cylindrical peripheral wall 32 of the rotary drum 28. The soil punch tools are equally spaced about the cylindrical peripheral wall 32 and extend radially outwardly from the wall.

Figure 6:
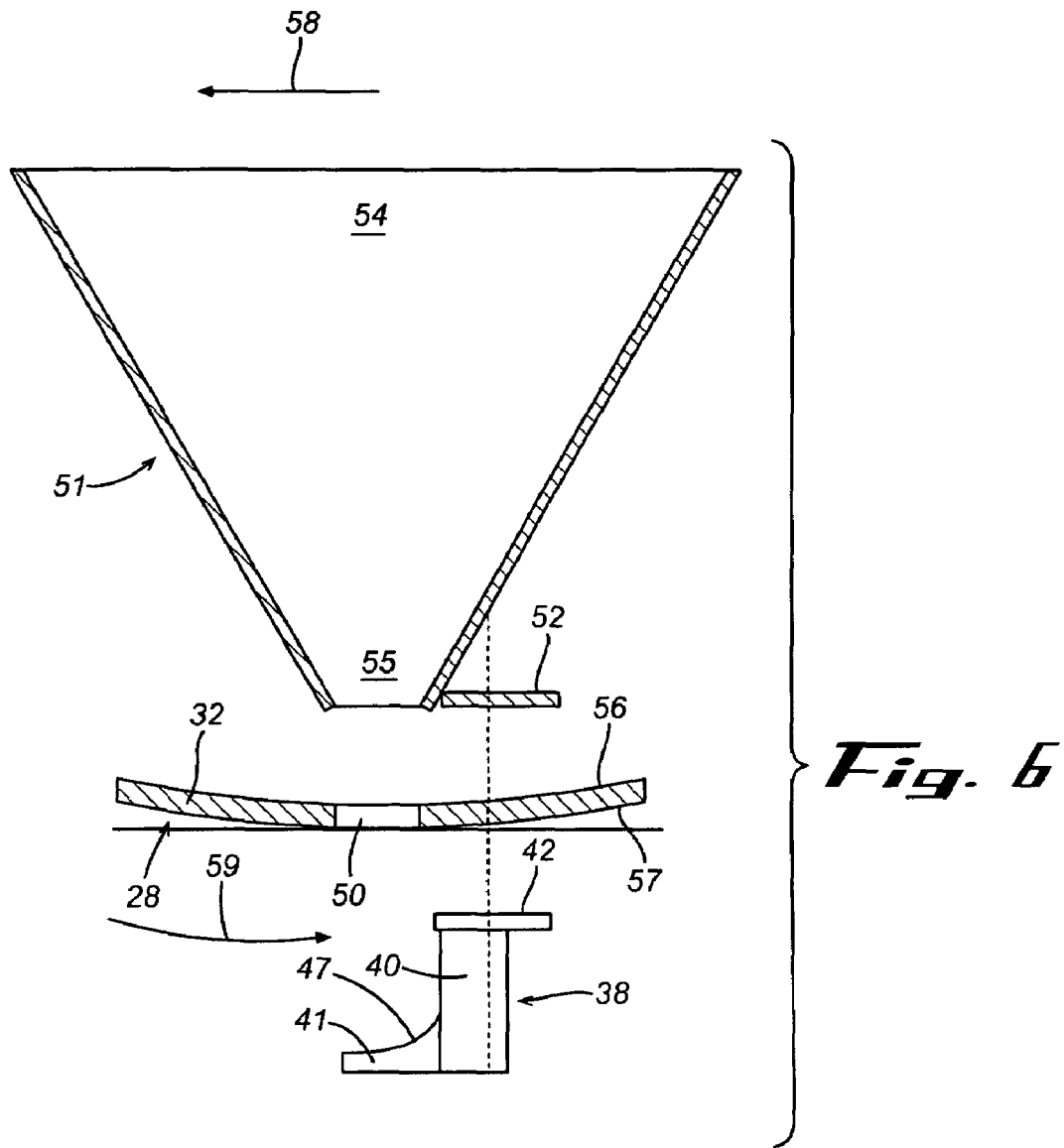
FIG. 6 is an expanded cross-sectional side view of a seed cup, a portion of the cylindrical peripheral wall of the rotary drum, and a soil punch tool.

As shown in FIG. 6, the soil punch tools are J-shaped, with each including a leg 40 that extends radially outwardly from the axis of the cylindrical peripheral wall of the drum, and a toe 41 that extends laterally from the leg 40. A curved recess 47 is formed by and extends between the leg 40 and the toe 41. The curve of the recess aids in urging the seed to move to the end of the toe and into the hole dug by the tool. A mounting plate 42 is formed at the end of the leg opposite from toe 41, and includes side openings 43 for connection to the cylindrical peripheral wall 32 of the rotary drum.

Figure 7:
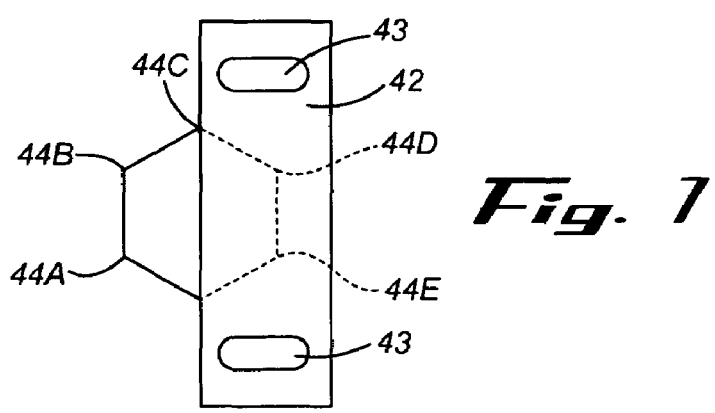
FIG. 7 is a plan view of a soil punch tool, with the back of the leg shown in dash lines.

As shown in FIG. 7, the legs 40 and toes 41 of the soil punch tools are formed in a hexagonal shape, which provides corners 44A-44E that are thrust into the soil underneath the rotary drum 28, and which punch holes in the soil and through any plastic mulch covering the soil. The plastic mulch 45 and the holes 46 formed in the plastic mulch are shown in FIG. 2. The sharpened angular edges 44A-44E enhance the penetration of the soil punch tools 38 through the plastic mulch, generally forming a clean edged hole, and requiring less force than a cylindrical soil punch tool.

As shown in FIG. 6, a seed passage is formed by the hole 50 in the cylindrical peripheral wall 32 of the rotary drum 28. The seed receptacle or "cup" 51 is mounted over the seed passage by passing a fastener (not shown) through the mounting plate connector openings 43 of the soil punch tool 38 (FIG. 7), through an aligned opening (not shown) in the cylindrical peripheral wall 32 of the rotary drum 28, and through other aligned openings (not shown) in the mounting plate 52 of the seed receptacle 51. The seed receptacle is approximately funnel-shaped, but having a rectangular cross-sectional shape, having a relatively wide upper opening 54 and a relatively constricted lower opening 55. The lower opening 55 of the seed cup 51 is sized, shaped, and positioned so as to correspond to the size, shape and position of seed passage 50 of the cylindrical peripheral wall 32 of the rotary drum 28.

When assembled, the smaller lower opening of the seed cup 51 abuts the inner surface 56 of the cylindrical peripheral wall 32 in alignment with the seed passage 50, and the soil punch tool 38 abuts the outer surface 57. The leg 40 of the soil punch tool 38 is offset from the seed passage 50 of the drum so as to allow the seed to move downwardly from the seed passage 50. But the toe 41 is positioned in approximately radial alignment with the seed passage to form the holes in the plastic mulch and in the soil that receive the seed.

Figure 8A:
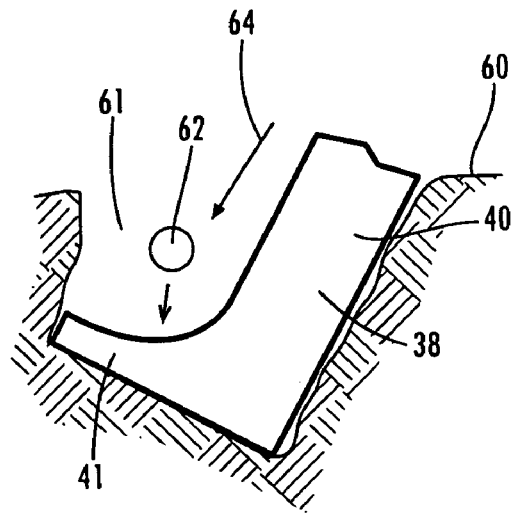
FIGS. 8A, 8B and 8C are sequential illustrations of how a soil punch tool forms the hole in the soil and is withdrawn from the soil and how a seed is dropped in the hole.
Figure 8B:
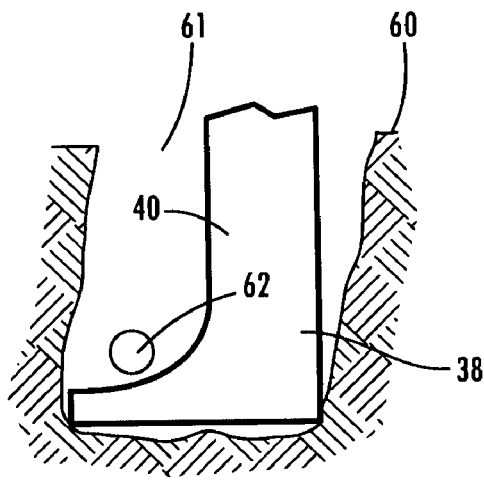
Figure 8C:
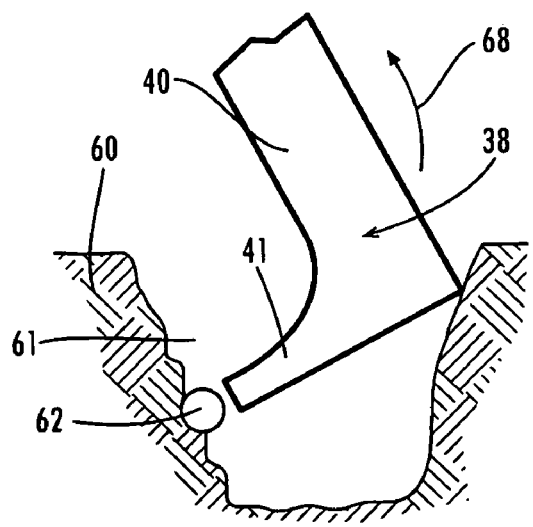

As illustrated in FIG. 6, as the rotary drum "walks" across the mulch covered soil in the direction as indicated by upper arrow 58, the rotary drum 28 rotates about its axis of rotation in the direction as indicated by lower arrow 59. As shown in FIG. 8A of the sequence of FIGS. 8A, 8B, and 8C, when the rotary drum rotates in contact with the soil, the soil punch tools 38 "walk" as indicated by arrow 64, first moving downwardly so as to punch through the plastic mulch and form the hole 61 in the soil 60. As the punch tool is forming its hole, a seed 62 is dropped from the seed cup 51, through seed passage 50 of the drum, into the hole 61 and on to the toe 41 of the soil punch tool 38. FIG. 8B shows the seed as it has reached the toe of the soil punch tool and the punch tool is in its lowermost penetration. The curvature of the recess 47 aids in urging the seed 62 toward the distal end of the toe. In FIG. 8C the soil punch tool begins to tilt as it withdraws from its hole as indicted by arrow 65. This allows the seed 62 to fall off the distal edge of the toe 41, so that the seed remains in the hole.

Figure 3:
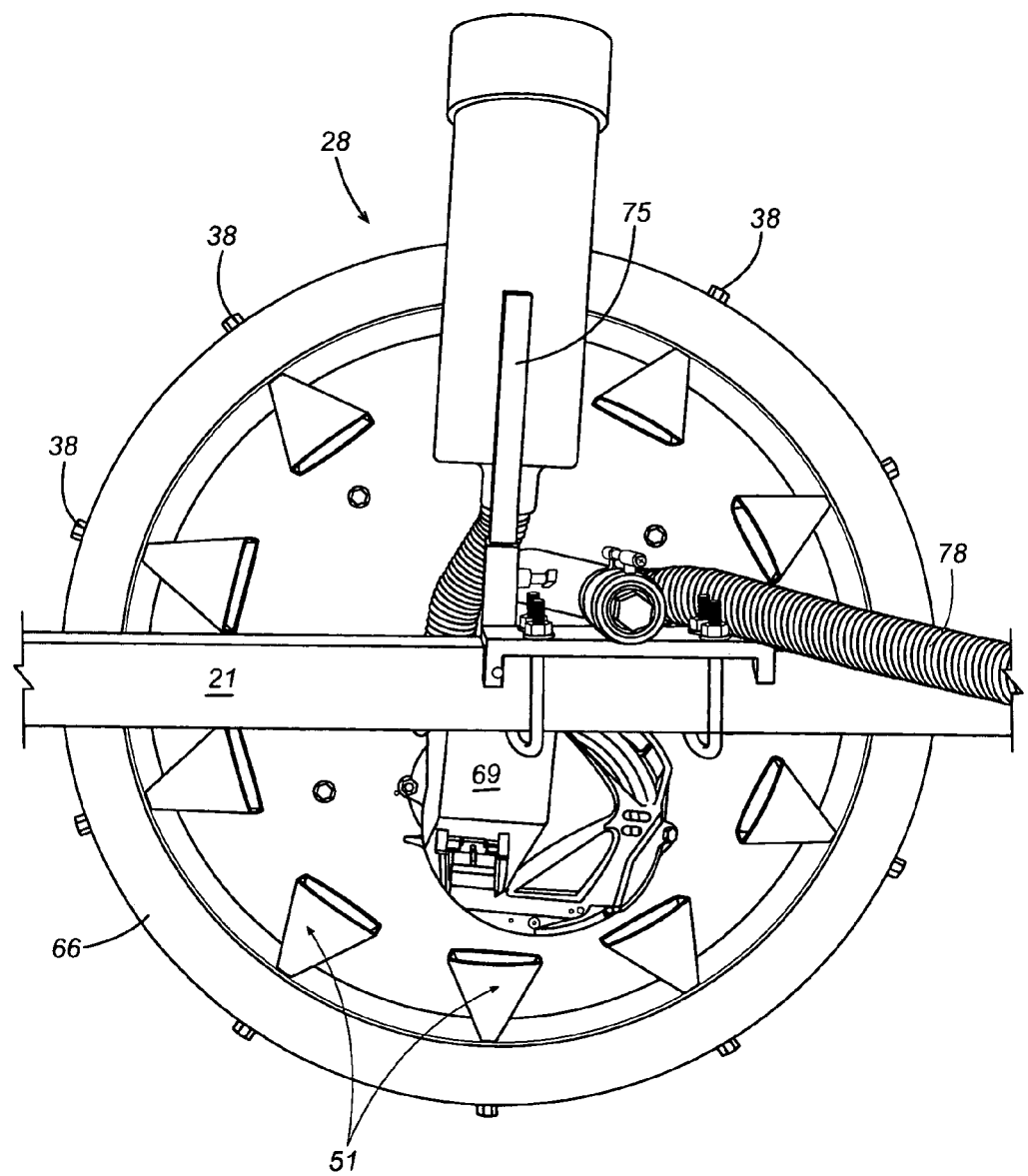
FIG. 3 is a side elevational view of the drum, seed hopper, seed meter and a portion of the frame.

FIG. 3 shows the side of the rotary drum opposite to that shown in FIG. 1. As can be seen from FIG. 3, the plurality of seed cups 51 are spaced circumferentially about the inner surface 56 of the rotary drum, and circular flange 66 forms a peripheral wall about the open side of the rotary drum.

Figure 4:
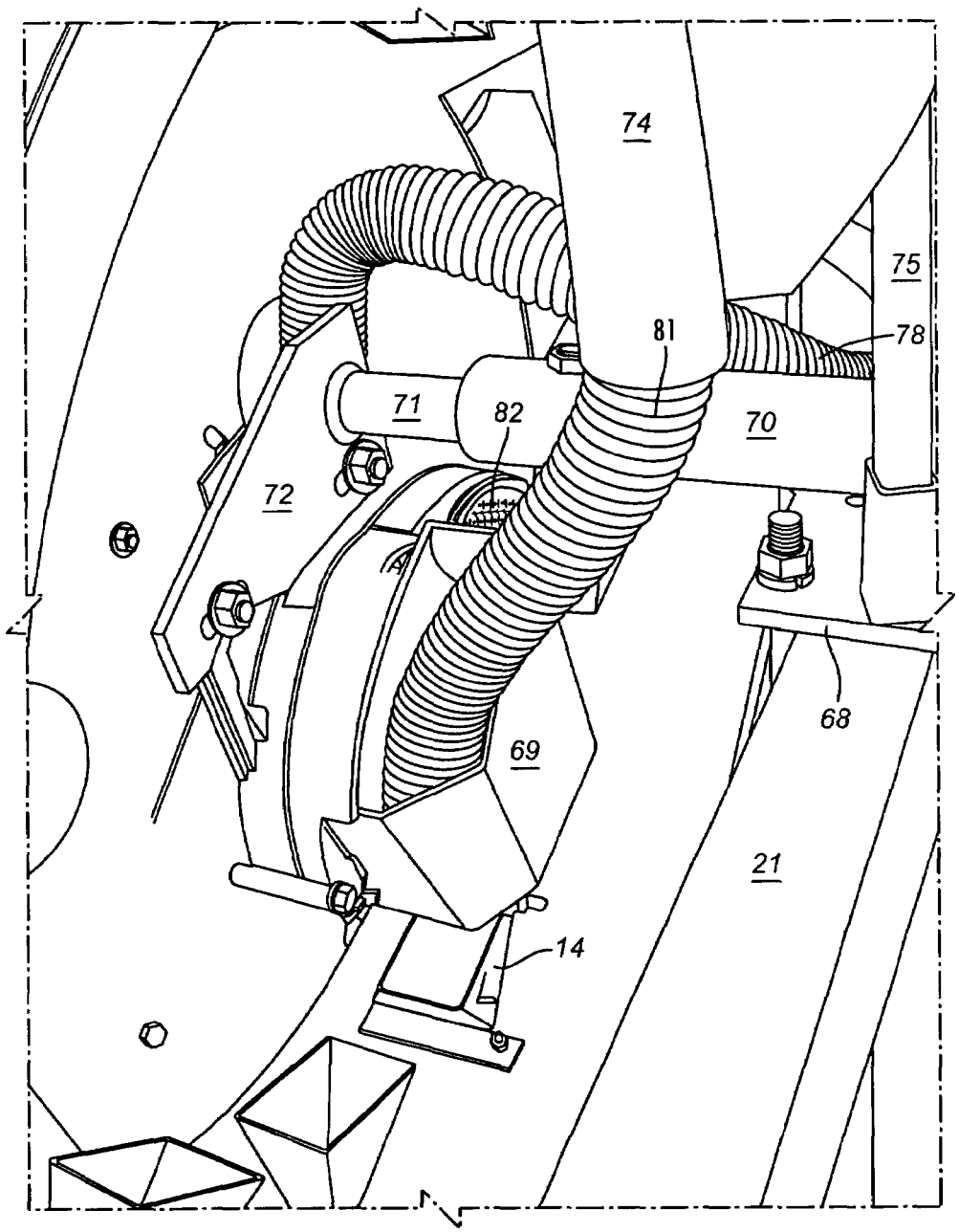
FIG. 4 is a perspective view of the lower portion of the seed hopper and the seed meter.

Horizontal mounting plate 68 is attached to the longitudinal frame element 21 on the open side of the rotary drum 28, and seed meter 69 is suspended by the horizontal mounting plates 68 which receives the vertical support shaft 71 with its attached vertical support plate 72. The seed meter 69 is supported generally within the extended cylindrical shape of the cylindrical peripheral wall 32 of the rotary drum, preferably in a position centrally aligned over the rotating path of the seed cups 51 and marginally above the seed cups. As shown in FIG. 4, the horizontal mounting plate 68 has a part of its structure a telescopic support tube 70 that receives its mating tube 71 of the vertical support plate 72. The vertical support plate 72 supports the seed meter 69 in a stationary but adjustable position with respect to the rotating rotary drum 28. Horizontal mounting plate 68 is adjustable fore and aft along frame element 21 and vertical support shaft 71 is adjustable left and right within the telescopic support tube 70. The adjustments of horizontal mounting plate 68 and vertical support shaft 71 positions the seed meter 69 over the rotating centerline of the seed cups mounted to the inner wall 32. A seed hopper 74 is positioned above the seed meter 69 and is also supported by the horizontal mounting plate 68, with its support leg 75 extending from the seed hopper downwardly into engagement with the horizontal mounting plate 68. With this arrangement, the seed meter and seed hopper may be easily removed from and replaced on the longitudinal frame element 21.

As shown in FIG. 3, the seed meter 69 is positioned closely adjacent the upper opening 54 of each of the seed cups 51 so that the seed cups 51 pass in a circular motion immediately adjacent the seed meter, so that the seed meter can easily drop a seed into each cup as the cups pass beneath the seed meter.

Seed meters, such as seed meter 69, are disclosed in U.S. Pat. No. 5,535,917 and are commercially available.

Figure 5:
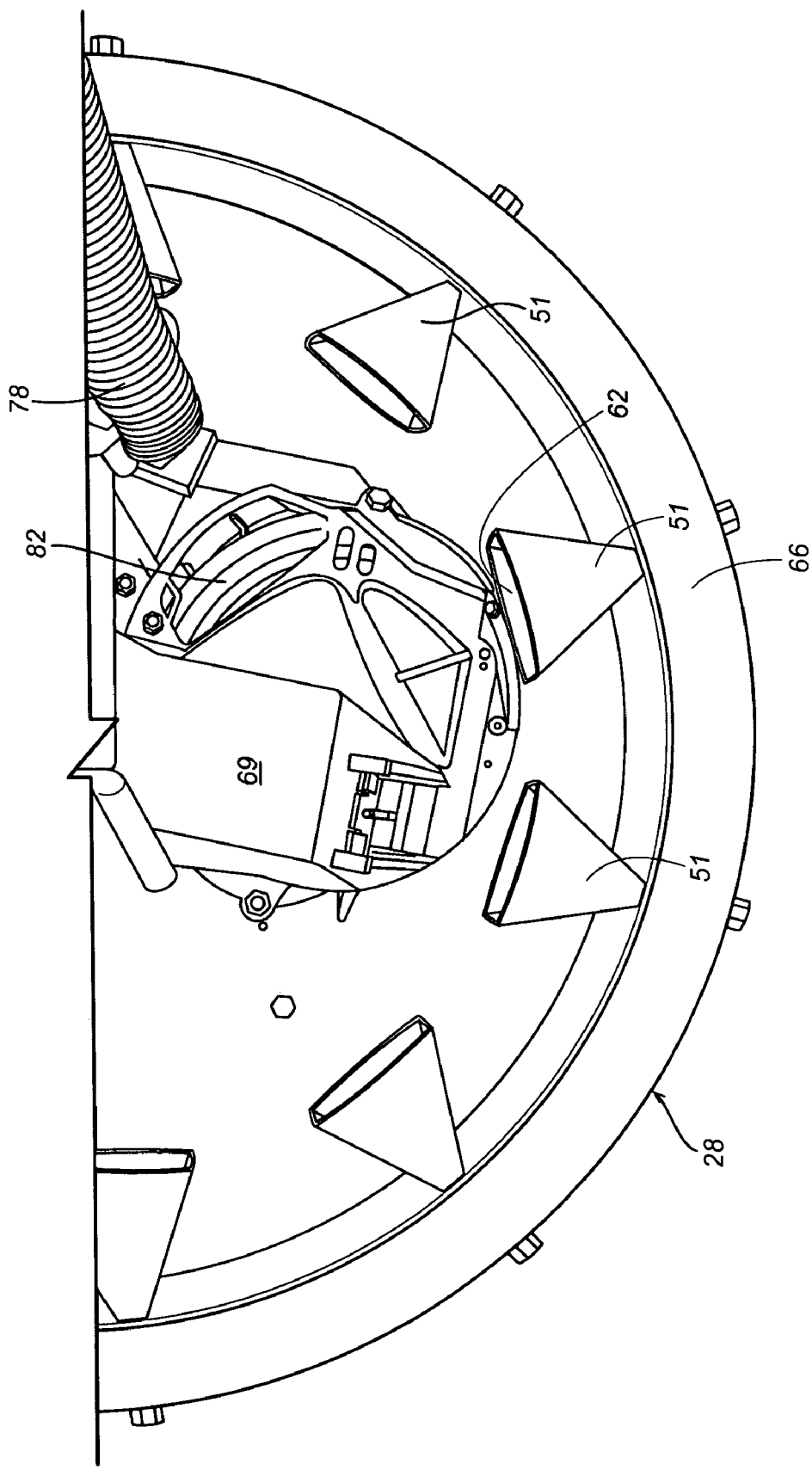
FIG. 5 is a side elevational view of the lower portion of the rotary drum and its series of seed receptacles, and the seed meter, illustrating how the seeds are dropped from the seed meter into the moving seed receptacles.

As shown in FIGS. 3 and 1, suction conduit 78 extends between seed meter 69 and the inlet of a suction blower 80 that is mounted on the forward frame 13. The suction blower is driven by the power takeoff of the tractor 12. The suction draws the seeds from the seed hopper 74 (FIG. 3), through the seed feed tube 81 to the apertured rotary seed separator plate 82 shown in FIGS. 4 and 5 of the seed meter 69. This draws an individual seed to each opening, and as the seed plate rotates. The suction is relieved from the next position of the seed separator plate and the seed is free to fall under the influence of gravity from the seed meter 69 into one of the seed cups 51.

A vacuum seed meter is disclosed in more detail in U.S. Pat. No. 5,5635,917. Vacuum seed meters use negative air pressure to attach seeds to small openings in a seed disc. The seed disc rotates about a central axis within the seed meter and negative air pressure on one side of the disc draws seeds on the other side of the disk to the openings. As the openings of the disc rotate further the negative air pressure is relieved and the seeds drop in a timed relationship from the seed meter to the seed cups 51.

The timing of the seed meter 69 with respect to the rotation of the rotary drum 28 is adjustable. The adjustment of the timing of the seed meter with respect to the rotary drum might be required so that a seed is delivered to each seed cup as the seed cups and their soil punch tools approach the surface of the soil and begin to make the hole through the plastic mulch and down into the soil.

Figure 9:
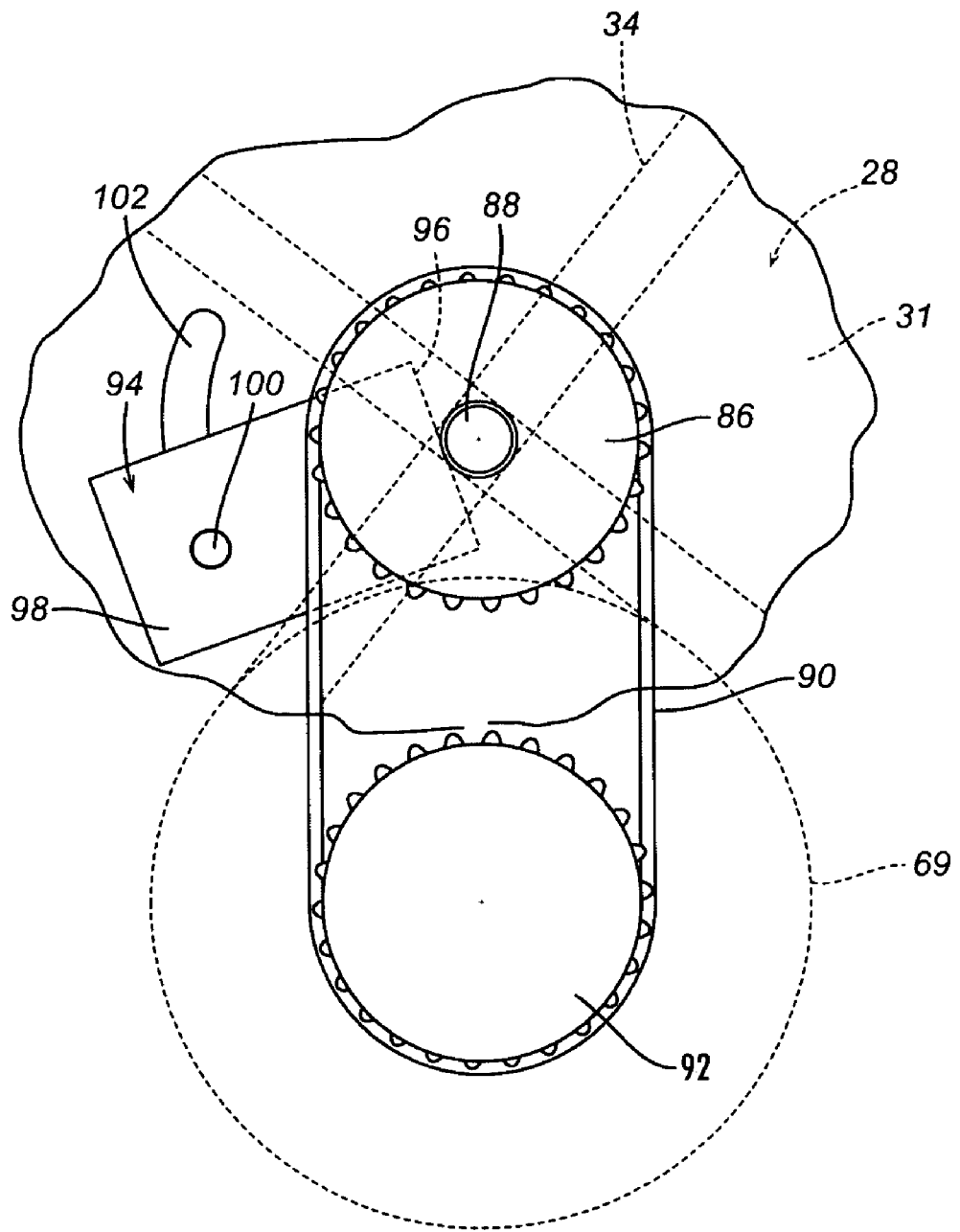
FIG. 9 is a side elevation of the drum sprocket and the seed meter sprocket with the timing chain, showing how the timing of the seed meter can be adjusted.

As shown in FIG. 9, a drum sprocket 86 is mounted about axle 88 of rotary drum 28 and rotates in unison with the rotary drum. The drum sprocket drives the seed meter timing chain 90 that engages the driven sprocket 92 of the seed meter 69. Timing lever 94 is fixedly attached at its inner end 96 to the drum sprocket 86 and is adjustably attached at its distal end 98 to the rotary drum 28. A timing bolt 100 attaches the distal end 98 of the timing lever 94 to the side wall 31 of the rotary drum 28. An arcuate slot 102 is formed in the side wall 31 of the rotary drum 28 and receives timing bolt 100. This allows the timing bolt and the distal end 98 of the timing lever 94 to be moved along the arcuate timing slot and the timing bolt 100 tightened to fixedly attach the distal end of the timing lever 94 to the side wall 31. This adjusts the position of the drum sprocket 86 with respect to the seed meter sprocket 92 and changes the timing of the seed meter 69 with respect to the rotation of the rotary drum 28, to drop seeds earlier or later during the rotation of the rotary drum.

Since the upper opening 54 of the seed cup 51 is large, and since the space between the upper opening of the seed cup and the seed meter 69 is small, the likelihood of the seeds missing the seed cups is remote. In practice, the upper opening 54 of the seed cup is greater than three inches, and the drop between the seed meter and the upper opening of the seed cup is less than one inch.

It will be noted that the length of the timing chain 90 extending from the sprocket 86 of the rotary drum to the sprocket 92 of the seed meter 69 is small so that any play in the timing chain is kept at a minimum, thereby increasing the accuracy of the timing between the rotary drum and the seed meter.

The relatively small number of moving parts, the placement of the seed meter close to the rotary path of the seed cups, and the monolithic structure and the shape of the soil punch tools help to provide a rugged, accurate and reliable seed planter.

Although preferred embodiments of the invention have been disclosed in detail herein, it will be obvious to those skilled in the art that variations and modifications of the disclosed embodiments can be made without departing from the spirit and scope of the invention as set forth in the following claims.

I claim:

1. A seed planter for planter seeds in the ground, comprising:
   a frame adapted for movement over the surface of the ground,
   a drum including a cylindrical peripheral wall defining a central axis, an inner surface and an outer surface, the cylindrical peripheral wall defining a series of seed passages at circumferentially spaced intervals about the cylindrical peripheral wall,
   the drum rotatably mounted at the central axis of the drum to the frame for rolling on the outer surface of the cylindrical wall along the surface of the ground,
   a series of soil punch tools mounted to and extending outwardly from the outer surface of the cylindrical peripheral wall of the drum, each soil punch tool mounted at one of each of the seed passages,
   a series of seed receptacles supported at and extending inwardly of and movable with the inner surface of the cylindrical peripheral wall in a circular path about the central axis, and each of the seed receptacles positioned at a seed passage and configured for feeding seeds through the seed passages in the cylindrical wall of the drum to one of the soil punch tools,
   a vacuum seed meter positioned within the cylindrical wall of the drum and supported by the frame for feeding seeds to the seed receptacles, and
   a drive connected to the drum and the vacuum seed meter for operating the vacuum seed meter in response to the rotation of the drum.

2. The seed planter of claim 1, wherein the soil punch tools are mounted to the outer surface of the cylindrical peripheral wall at a positions circumferentially spaced from the seed passages.

3. The seed planter of claim 1, wherein the soil punch tools are J-shaped, each soil punch tool including a rectilinear leg that extends radially from the cylindrical peripheral wall of the drum and a toe that extends laterally from the leg, the legs of the soil punch tools being displaced from alignment with the seed passages of the cylindrical peripheral wall and the toes radially aligned with the seed passages.

4. The seed planter of claim 1, wherein the soil punch tools are octagonal.

5. The seed planter of claim 1 and further including a seed hopper supported by the frame at a position extending higher than the drum.

6. The seed planter of claim 1, and wherein the drum further includes at least one wall extending transverse to the central axis of the drum.

7. The seed planter of claim 6, wherein the wall closes one end of the drum and the other end of the drum is open.

8. The seed planter of claim 1, wherein the drive member comprised a gear movable in timed relationship with the rotation of the drum.

9. The seed planter of claim 8, wherein a timing chain extends between the seed meter and the gear of the drum.

10. A seed planter for planting seeds in the ground, comprising:
    a drum including a cylindrical peripheral wall defining a central axis, an inner surface and an outer surface,
    the drum rotatably mounted at the central axis for rolling on the outer surface about the central axis along the surface of the ground,
    a series of soil punch tools mounted at circumferentially spaced intervals to and extending outwardly from the outer surface of the cylindrical peripheral wall of the drum,
    a series of seed receptacles supported at and movable with the cylindrical peripheral wall in a circular path about the central axis and each seed receptacle positioned at a soil punch tool,
    the cylindrical peripheral wall defining seed passages aligned with each of the seed receptacles and one of the soil punch tools such that the seed receptacles and seed passages are configured for feeding seeds to the soil punch tools,
    a seed meter supported by the frame for feeding seeds to the seed receptacles, through the seed passages and to the soil punch tools, and
    a drive connected to the drum for operating the seed meter in response to the rotation of the drum.

11. The seed planter of claim 10, wherein the drive comprises a timing sprocket mounted at the axis of the drum, and an adjustment device for adjusting the rotary position of the timing sprocket with respect to the position of the drum.

12. The seed planter of claim 11, and further including a frame, the drum rotatably mounted at the axis to the frame, and the seed meter mounted to the frame.

13. A method of planting seed in the ground, comprising:
    rolling a cylindrical wall of a drum on the ground about an axis of rotation,
    applying the weight of the drum on the ground,
    forming holes in the ground with punch tools mounted on the cylindrical wall of the drum,
    moving seed receptacles each in continuous alignment with a seed passage in the cylindrical wall of the drum and in alignment with a punch tool in unison at the periphery of the drum, and
    feeding seeds from a seed meter at a position within the perimeter of the drum into each seed receptacle passing below the axis of rotation and through the seed passage aligned with the seed receptacle to the ground and into the hole in the ground formed by the punch tool.

14. The method of planting seed as set forth in claim 13, wherein the step of feeding seeds from a seed meter at a position within the perimeter of the drum comprises feeding seeds from the seed meter positioned below the level of the axis of rotation of the drum.

15. The method of claim 13, wherein the step of punching a series of holes in the ground comprises punching holes that have an octagonal shape.

16. The method of claim 13, wherein the step of feeding seeds comprises driving the seed meter with a timing chain extending from the axis of the drum to the seed meter.

17. The method of claim 13, wherein the step of feeding seeds includes moving the seeds between the seed meter and the toward the seed receptacles by the force of gravity without requiring an air stream.

18. The method of claim 13, wherein the step of feeding seeds includes dropping the seeds from the seed meter toward the seed receptacles without requiring an air stream.

* * * * *